United States Patent
Bouwens et al.

(10) Patent No.: US 11,337,436 B2
(45) Date of Patent: May 24, 2022

(54) WATER-IN-OIL EMULSION

(71) Applicant: Conopco Inc., Englewood Cliffs, NJ (US)

(72) Inventors: Elisabeth Cornelia Maria Bouwens, Vlaardingen (NL); Hendrikus Theodorus W. M. van der Hijden, Vlaardingen (NL); Marinus Willem Koster, Vlaardingen (NL); Jan Hendrik T. Verbeek, Vlaardingen (NL); Robert Vreeker, Vlaardingen (NL)

(73) Assignee: Conopco Inc., Englewood Cliffs, NJ (US)

(*) Notice: Subject to any disclaimer, the term of this patent is extended or adjusted under 35 U.S.C. 154(b) by 0 days.

(21) Appl. No.: 16/470,984

(22) PCT Filed: Dec. 12, 2017

(86) PCT No.: PCT/EP2017/082326
§ 371 (c)(1),
(2) Date: Jun. 19, 2019

(87) PCT Pub. No.: WO2018/114449
PCT Pub. Date: Jun. 28, 2018

(65) Prior Publication Data
US 2020/0037628 A1    Feb. 6, 2020

(30) Foreign Application Priority Data
Dec. 23, 2016    (EP) .................................... 16206776

(51) Int. Cl.
*A23D 7/005* (2006.01)
*A23L 33/24* (2016.01)
(Continued)

(52) U.S. Cl.
CPC .......... *A23D 7/0056* (2013.01); *A23L 29/262* (2016.08); *A23L 33/22* (2016.08); *A23L 33/24* (2016.08)

(58) Field of Classification Search
CPC ....... A23D 7/0056; A23L 33/24; A23L 33/22; A23L 29/262
(Continued)

(56) References Cited

U.S. PATENT DOCUMENTS

| 3,950,568 A | 4/1976 | Parker |
| 8,986,501 B2 | 3/2015 | Li et al. |

(Continued)

FOREIGN PATENT DOCUMENTS

| CL | 20140003334 | 6/2015 |
| CL | 20150001783 | 10/2015 |

(Continued)

OTHER PUBLICATIONS

Binding of Water, Oil, and Bile Acids to Dietary Fibers of the Cellan Type, German Institute of Human Nutrition Potsdam-Rehbrucke, Arthur-Scheunert-Allee 114-116, D-14558 Bergholz-Rehbrucke, Germany, and Institute of Biology, Humboldt-University Berlin, Invalidentstrasse 42, D-10115 Berlin, Germany. (Year: 1999).*

(Continued)

*Primary Examiner* — Brent T O'Hern
(74) *Attorney, Agent, or Firm* — N.V. Nederlandsch Octrooibureau

(57) ABSTRACT

The present invention relates to a water-in-oil emulsion comprising 30-90 wt. % of a structured continuous fat phase and 10-70 wt. % of a dispersed aqueous phase, said structured continuous fat phase comprising:
95-99.9 wt. % fat, said fat having a solid fat content at 20° C. ($N_{20}$) of 5-50% and a liquid oil content at 20° C. that equals 100%-$N_{20}$;

(Continued)

particulate anhydrous non-defibrillated cell wall material from plant parenchymal tissue, said particulate anhydrous non-defibrillated cell wall material having a particle size of between 25 μm and 500 μm;

wherein the particulate anhydrous non-defibrillated cell wall material is present in the structured continuous fat phase in a concentration of 0.2-10% by weight of the liquid oil.

Incorporation of the aforementioned particulate cell wall material in the fat phase of the water-in-oil emulsion makes it possible to reduce the amount of high melting (hard stock) fat that is required in the production of the emulsion.

12 Claims, 1 Drawing Sheet

(51) Int. Cl.
*A23L 33/22* (2016.01)
*A23L 29/262* (2016.01)

(58) Field of Classification Search
USPC .......................................................... 426/602
See application file for complete search history.

(56) References Cited

U.S. PATENT DOCUMENTS

| | | |
|---|---|---|
| 8,987,481 B1 | 3/2015 | Gupta |
| 2004/0086626 A1 | 5/2004 | Lundberg et al. |
| 2005/0118326 A1 | 6/2005 | Anfinsen |
| 2008/0233238 A1 | 9/2008 | Roney et al. |
| 2011/0281014 A1 | 11/2011 | Higgins |
| 2011/0281015 A1* | 11/2011 | Higgins ................ A23G 9/327 426/606 |
| 2012/0053251 A1* | 3/2012 | Ervin ................... A23G 3/346 514/784 |
| 2013/0202771 A1 | 8/2013 | Corbin et al. |
| 2014/0056946 A1 | 2/2014 | Helin et al. |
| 2015/0175980 A1 | 6/2015 | Tsang et al. |
| 2016/0030907 A1 | 2/2016 | Van Engelen et al. |
| 2018/0319957 A1 | 11/2018 | Jin |

FOREIGN PATENT DOCUMENTS

| | | | |
|---|---|---|---|
| EP | 0478401 A2 | 4/1992 | |
| EP | 0533147 | 3/1993 | |
| EP | 0545002 | 6/1993 | |
| EP | 2462817 | 6/2012 | |
| JP | 2007051075 | 3/2007 | |
| WO | WO0218486 | 7/2002 | |
| WO | WO2005107500 | 11/2005 | |
| WO | WO2014095342 | 6/2014 | |
| WO | WO2014147393 | 9/2014 | |
| WO | 2015/128155 A1 | 9/2015 | |
| WO | WO-2015128155 A1 * | 9/2015 | ............. A23L 23/10 |
| WO | WO2015130163 | 9/2015 | |

OTHER PUBLICATIONS

G. Dongowski et al: "Binding of Water, Oil, and Bile Acids to Dietary Fibers of the Cellan Type", Biotechnology Progress, vol. 15, No. 2, Apr. 5, 1999 (Apr. 5, 1999), pp. 250-258, XP055053455, ISSN: 8756-7938, DOI: 10.1021/bp990014c abstract.

Majzoobi "Improvement of the quality of gluten-free sponge cake using different levels and particle sizes of carrot pomace powder." International Journal of Food Science & Technology 51.6 (2016): 1369-1377.

McCann et al. "Microstructure, rheology and storage stability of low-fat yoghurt structured by carrot cell wall particles." Food research international 44.4 (2011): 884-892.

Chantaro "Production of antioxidant high dietary fiber powder from carrot peels." LWT—Food Science and Technology 41.10 (2008): 1987-1994.

Ma et al. "Physicochemical properties and intestinal protective effect of ultra-micro ground insoluble dietary fibre from carrot pomace." Food & function 7.9 (2016): 3902-3909.

Aubergine is egg plant; Google search; Jun. 15, 2021; pp. 1-3.
Parenchyma Cells; Biology Dictionary; Jun. 15, 2021; pp. 1-5.

* cited by examiner

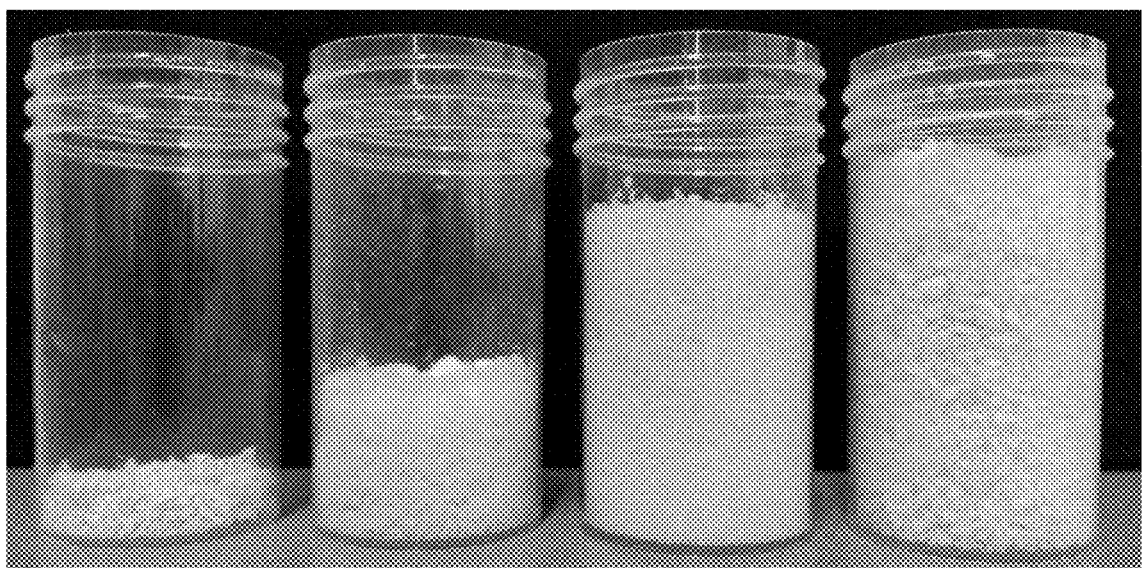

WATER-IN-OIL EMULSION

FIELD OF THE INVENTION

The present invention relates to a water-in-oil emulsion, more particularly a water-in-oil emulsion comprising 30-90 wt. % of a structured continuous fat phase and 10-70 wt. % of a dispersed aqueous phase, said structured continuous fat phase comprising fat having a solid fat content at 20° C. ($N_{20}$) of 5-50% and particulate anhydrous non-defibrillated cell wall material from plant parenchymal tissue, said particulate anhydrous non-defibrillated cell wall material having a particle size of between 25 µm and 500 µm;

The invention also relates to a process of preparing such a water-in-oil emulsion.

BACKGROUND TO THE INVENTION

Water-in-oil emulsions comprising a structured continuous fat phase in combination with a dispersed aqueous phase are well-known. Examples of such emulsions include spreads, kitchen margarines and bakery margarines. The structured continuous fat phase of the aforementioned products largely determines the rheological and textural properties as well as the stability of these compositions.

Traditionally the fat phase of water-in-oil emulsions is structured by a crystalline high melting fat matrix. However, it is desirable to reduce the amount of high melting (hard stock) fat in these emulsions, e.g. because of limited natural availability of these high melting fats (such as palm oil) or because of adverse effects on consumer health (due to high levels of saturated fatty acids).

Cellulose is an organic compound with the formula $(C_6H_{10}O_5)_n$, a polysaccharide consisting of a linear chain of several hundred to many thousands of β(1→4) linked D-glucose units. Cellulose is an important structural component of the primary cell wall of green plants, many forms of algae and the oomycetes. Some species of bacteria secrete it to form biofilms. Plant-derived cellulose is usually found in a mixture with hemicellulose, lignin, pectin and other substances, while bacterial cellulose is quite pure.

Cellulose is a straight chain polymer: unlike starch, no coiling or branching occurs, and the molecule adopts an extended and rather stiff rod-like conformation, aided by the equatorial conformation of the glucose residues. The multiple hydroxyl groups on the glucose from one chain form hydrogen bonds with oxygen atoms on the same or on a neighbor chain, holding the chains firmly together side-by-side and forming microfibrils with high tensile strength. This confers tensile strength in cell walls, where cellulose microfibrils are meshed into a polysaccharide matrix.

Microfibrillated cellulose, also referred to a nanofibrillated cellulose, is the term used to describe a material that is composed of cellulose microfibrils (or cellulose nanofibrils) that can be isolated from disrupted and disentangled cellulose containing primary or secondary plant cell material or pellicles (in the case of bacterial cellulose). These cellulose microfibrils typically have a diameter of 3-70 nanometers and a length that can vary within a wide range, but usually measures several micrometers. Aqueous suspensions of microfibrillated cellulose are pseudo-plastic and exhibit a property that is also observed in certain gels or thick (viscous) fluids, i.e. they are thick (viscous) under normal conditions, but flow (become thin, less viscous) over time when shaken, agitated, or otherwise stressed. This property is known as thixotropy. Microfibrillated cellulose can be obtained and isolated from a cellulose containing source through high-pressure, high temperature and high velocity impact homogenization, grinding or microfluidization.

EP-A 0 533 147 describes a margarine comprising microfibrillated cellulose.

US 2011/0281014 and US 2011/0281015 disclose shortening compositions comprising an admixture of a cellulose fiber, a hard fat, and a liquid oil, wherein the shortening composition comprises less than about 1% water by weight based on total weight of the composition.

US 2013/0209655 describes a spread composition comprising 40-65% water, 1-25% seeding agent, 1-15% cellulose fiber, and 10-40% base oil based on the total weight of the composition, wherein the seeding agent comprises a blend of a diacylglyceride, a monoacylglyceride and a triacylglyceride.

US 2016/0030907 discloses subjecting vegetable material such as sugar beet pulp to a chemical treatment (e.g. with NaOH) resulting in partial degradation and/or extraction of pectin, followed by treatment with a high pressure homogeniser. The so-obtained material can be used in the stabilisation of suspended solid particles and/or gas bubbles in aqueous fluids.

WO2015/128155 discloses the use of compressed dried cell clusters (plant parenchymal cell wall clusters) as a structurant in instant dry products, optionally after grinding the compressed clusters. The bulk density of such compressed clusters is at least 100 g/l. It may be used as a replacer of (modified) starch.

G. Dongowski et al, in "Binding of water, oil and bile acids to dietary fibres of the cellan type" (Biotechnology Progress, vol. 15 no. 2, April 1999, pages 250-258 disclose that dietary fibres of the "cellan type" (consisting mainly or exclusively of undestroyed cells) can bind or adsorp water, oil, detergent-stabilised oil/water emulsions and bile acids.

SUMMARY OF THE INVENTION

The inventors have discovered a way to reduce the amount of hard stock fat that is required in the production of water-in-oil emulsions comprising a structured continuous fat phase. It was found that particulate anhydrous non-defibrillated cell wall material from plant parenchymal tissue having a particle size of between 25 µm and 500 µm is capable of structuring liquid oil. This particulate cell wall material differs from microfibrillated cellulose in that it does not largely consist of cellulose microfibrils that have been isolated from disrupted and disentangled cellulose containing primary or secondary plant cell material. Instead the particulate anhydrous non-defibrillated cell wall material that is used in accordance with the present invention is largely composed of particles that contain cell wall fragments in which the cellulose microfibrils are still linked via hemicellulosic tethers into a cellulose-hemicellulose network that is embedded in a pectin matrix.

Thus, the present invention provides a water-in-oil emulsion comprising 30-90 wt. % of a structured continuous fat phase and 10-70 wt. % of a dispersed aqueous phase, said structured continuous fat phase comprising:

95-99.9 wt. % fat, said fat having a solid fat content at 20° C. ($N_{20}$) of 5-50% and a liquid oil content at 20° C. that equals 100%-$N_{20}$;

particulate anhydrous non-defibrillated cell wall material from plant parenchymal tissue, said particulate anhydrous non-defibrillated cell wall material having a particle size of between 25 µm and 500 µm;

wherein the particulate anhydrous non-defibrillated cell wall material is present in the structured continuous fat phase in a concentration of 0.2-10% by weight of the liquid oil.

The particulate cell wall material of the present invention has an extremely low bulk density, i.e. typically a bulk density of less than 50 g/l. In other words, the particles within the particulate cell wall material have a very high porosity. Although the inventors do not wish to be bound by theory, it is believed that liquid oil is capable of entering the particles within the particulate cell wall material. These oil-filled particles increase the viscosity of the fat phase and at higher concentration they can even render liquid oil semi-solid. It is believed that the structuring capability of the particulate cell wall material is due to its capacity to build a space-filling (percolating) network. Thus, surprisingly, the particulate cell wall material, which is hydrophilic in nature, remains suspended within the hydrophobic fat phase and can supplement the oil structuring capacity of hard stock fat.

The particulate cell wall material that is employed in accordance with the present invention may suitably be produced from plant parenchymal tissue by comminuting said tissue and drying the comminuted tissue. Particulate cell wall material that is particularly effective in structuring oil can be obtained by (i) comminuting plant parenchymal tissue, (ii) subjecting the tissue to a heat treatment before, during or after comminution, (iii) extensively washing the heat treated and comminuted material with water, and (iv) drying the washed material. The washing step results in the removal of water-soluble components such as pectin, sugars and water-soluble salts. As a result of the removal of pectin, the ratio of galacturonic acid to glucose in the polysaccharide component of the starting material (plant parenchymal tissue) is reduced substantially.

The functionality of the particle cell wall material may be further enhanced by subjecting the heat treated and comminuted material to conditions of high shear.

Due to the fact that the aforementioned particulate cell wall material is hydrophilic, care should be taken during manufacture of the water-in-oil emulsion that this cell wall material does not migrate to the aqueous phase. The inventors have found that this can be achieved by preparing a pre-emulsion by mixing molten fat and aqueous liquid, cooling the pre-emulsion to induce fat crystallisation, and mixing the cooled pre-emulsion with the particulate anhydrous non-defibrillated cell wall material.

Thus, another aspect of the invention relates to a process of preparing a water-in-oil emulsion, said process comprising:
  preparing a pre-emulsion by mixing molten fat and aqueous liquid, said fat having a solid fat content at 20° C. ($N_{20}$) of 5-50% and a liquid oil content at 20° C. that equals 100%-$N_{20}$;
  cooling the pre-emulsion to a temperature that is at least 5° C. below the slip melting point of the fat;
  mixing the cooled pre-emulsion with the particulate anhydrous non-defibrillated cell wall material from plant parenchymal tissue defined above.

The invention further relates to the use of particulate anhydrous non-defibrillated cell wall material for replacing hard stock fat in water-in-oil emulsions, said particulate anhydrous non-defibrillated cell wall material having a bulk density of less than 50 g/l and at least 90 wt. % of said particulate anhydrous non-defibrillated cell wall material having a particle size between 25 μm and 500 μm.

Finally, the invention provides a method of preparing particulate anhydrous non-defibrillated cell wall material having a bulk density of less than 50 g/l, at least 90 wt. % of said particulate anhydrous non-defibrillated cell wall material having a particle size between 25 μm and 500 μm, said method comprising:
  providing plant material having a water content of at least 50 wt. % and comprising parenchymal tissue from plant material selected from carrot, aubergine, cucumber, leek, sugar beet, apple, pear, pumpkin, kiwi, strawberry, *papaya*, pine apple, prune, melon, apricot, grapes onion, tomato, potato, coconut and combinations thereof, said parenchymal tissue providing at least 80 wt. % of the dry matter in the starting material;
  heating the plant material to a temperature 'T' exceeding $T_{min}$ of 70° C. during a time period 't' wherein temperature T (in ° C.) and the time period t (in minutes) meet the following equation:

$$t > 1200/(T-69)^{1.4};$$

washing the heated plant material or a fraction of the heated plant material with water to reduce the concentration of monosaccharides to less than 10% by weight of dry matter, said monosaccharides being selected from glucose, fructose and combinations thereof; and drying the washed plant material;
  wherein the plant material is comminuted before the washing step to produce a pulp.

DETAILED DESCRIPTION OF THE INVENTION

A first aspect of the present invention relates to a water-in-oil emulsion comprising 30-90 wt. % of a structured continuous fat phase and 10-70 wt. % of a dispersed aqueous phase, said structured continuous fat phase comprising:
  95-99.9 wt. % fat, said fat having a solid fat content at 20° C. ($N_{20}$) of 5-50% and a liquid oil content at 20° C. that equals 100%-$N_{20}$;
  particulate anhydrous non-defibrillated cell wall material from plant parenchymal tissue, said particulate anhydrous non-defibrillated cell wall material having a particle size of between 25 μm and 500 μm;
  wherein the particulate anhydrous non-defibrillated cell wall material is present in the structured continuous fat phase in a concentration of 0.2-10% by weight of the liquid oil.

The term "fat" as used herein refers to glycerides selected from triglycerides, diglycerides, monoglycerides, phosphoglycerides, free fatty acids and combinations thereof.

The terms 'fat' and 'oil' are used interchangeably, unless specified otherwise. Where applicable the prefix 'liquid' or 'solid' is added to indicate if the fat or oil is liquid or solid at 20° C. "Hard stock" is an example of a solid fat. Hard stock typically has a solid fat content at 20° C. ($N_{20}$) of at least 30%.

The term "structured continuous fat phase" as used herein refers to a continuous fat phase that contains a non-liquid component that introduces non-Newtonian behaviour into the fat phase.

The terminology "particulate anhydrous non-defibrillated cell wall material" as used herein refers to particulate cell wall material in which the cellulose microfibrils are linked via hemicellulosic tethers into a cellulose-hemicellulose network that is embedded in a pectin matrix particles, said particulate cell wall material having a water content of not more than 15 wt. %.

The term "liquid" as used herein refers to a state in which a material is a nearly incompressible fluid that conforms to the shape of its container. As such, it is one of the four fundamental states of matter (the others being solid, gas, and plasma), and is the only state with a definite volume but no fixed shape. The term "liquid" also encompasses viscous liquids.

The solid fat content of a fat at a temperature of t ° C. ($N_t$) can suitably be determined using ISO 8292-1 (2012)—Determination of solid fat content by pulsed NMR.

The slip melting point of a fat can suitably be determined using (ISO 6321 (2002).

The "Stevens" hardness (St) is expressed in grams. The Stevens hardness is measured as the "final load", using the procedure described in the Examples.

The particles size distribution of the particulate anhydrous non-defibrillated cell wall material can suitably be determined by means of sieving in oil, i.e. by employing a set of sieves of different mesh sizes and by dispersing the cell wall material into a sufficient quantity of oil before sieving. This same technique can be used to determine the particle size distribution of other non-fat particulate components of the oil-continuous composition.

The term "bulk density" as used herein, unless indicated otherwise, refers to freely settled bulk density.

The molar ratio of galacturonic acid to glucose as referred to herein is determined by first removing soluble sugars, and subsequently completely hydrolysing the polysaccharides (>10 monosaccharide units) and oligosaccharides (2-10 monosaccharide units) present, followed by quantification of the galacturonic acid and glucose content. Soluble sugars (e.g. glucose) are removed prior to analysis by alcohol extraction using the procedure described by in J Agric Food Chem. (2006) 54, 8471-9).

The galacturonic acid and glucose content can suitably be determined by means of the following procedure. Firstly, samples are pre-solubilized using 72% w/w sulfuric acid-$d_2$ at room temperature for 1 h. Subsequently the samples are diluted with $D_2O$ to 14% w/w sulfuric acid-$d_2$ and hydrolyzed in an oven at 100° C. for 3 h. The galacturonic acid and glucose content of the hydrolyzed samples are then determined using the NMR method described by de Souza et al. (*A robust and universal NMR method for the compositional analysis of polysaccharides* (2013) Carbohyd. Polym. 95, 657-663 and van Velzen et al. (*Quantitative NMR assessment of polysaccharides in complex food matrices* (2014) in Magnetic resonance in Food science—Defining food by magnetic resonance pp 39-48 F. Capozzi, L. Laghi and P. S. Belton (Eds.) Royal Society of Chemistry, Cambridge, UK).

Whenever reference is made herein to the water content of a composition or a material, unless indicated otherwise, this includes all the water that is present in said composition or material.

The word "comprising" as used herein is intended to mean "including" but not necessarily "consisting of" or "composed of." In other words, the listed steps or options need not be exhaustive.

Unless indicated otherwise, weight percentages (wt. %) are based on the total weight of a composition.

Unless specified otherwise, numerical ranges expressed in the format "from x to y" are understood to include x and y. When for a specific feature multiple preferred ranges are described in the format "from x to y", it is understood that all ranges combining the different endpoints are also contemplated. For the purpose of the invention ambient temperature is defined as a temperature of about 20 degrees Celsius.

The water-in-oil emulsion of the present invention preferably is not liquid at 20° C., more preferably the emulsion is solid or semi-solid at 20° C.

The water-in-oil emulsion of the present invention preferably contains 35-85 wt. of a of a structured continuous fat phase and 15-65 wt. % of a dispersed aqueous phase.

The combination of the structured continuous fat phase and the dispersed aqueous phase preferably constitutes at least 80 wt. %, more preferably at least 90 wt. %, even more preferably at least 95 wt. % and most preferably at least 98 wt. % of the water-in-oil emulsion.

The water-in-oil emulsion of the present invention typically has a Stevens hardness (final load) of at least 30 g. More preferably, the emulsion has a Stevens hardness in the range of 40 to 600 g, most preferably in the range of 50 to 400 g.

Examples of water-in-oil emulsions according to the present invention include spreads, kitchen margarines and bakery margarines.

Besides fat and the particulate cell wall material, the structured continuous fat phase may include dissolved components (e.g. anti-oxidants, flavourings, colourants, vitamins) and/or dispersed components having a diameter of less than 5 μm. These components are regarded as part of the structured continuous fat phase. In other words, dispersed components having a diameter of larger than 5 μm other than the particulate plant material of the present invention, are not part of the structured continuous fat phase.

The fat in the structured continuous fat phase preferably comprises at least 80 wt. %, more preferably at least 90 wt. % and most preferably at least 95 wt. % of one or more natural fats selected from coconut oil, palm kernel oil, palm oil, marine oils (including fish oil), lard, tallow fat, butter fat, soybean oil, safflower oil, cotton seed oil, rapeseed oil, linseed oil, sesame oil, poppy seed oil, corn oil (maize oil), sunflower oil, peanut oil, rice bran oil, olive oil, algae oil, shea fat, alanblackia oil; fractions of these oils. These fats may also be employed in hydrogenated and/or interesterified form.

According to a preferred embodiment, the fat present in the structured continuous fat phase preferably contains at least 50 wt. % of liquid oil selected from soybean oil, sunflower oil, rape seed (canola) oil, cotton seed oil, peanut oil, rice bran oil, safflower oil, palm olein, linseed oil, fish oil, high omega-3 oil derived from algae, corn oil (maize oil), sesame oil, olive oil, and combinations thereof. More preferably the liquid oil is selected from soybean oil, sunflower oil, rape seed oil, corn oil (maize oil), olive oil, linseed oil, palm olein and combinations thereof The fat that is contained in the structured continuous fat phase of the present composition preferably has a solid fat content at 20° C. ($N_{20}$) of 3-30%, more preferably of 5-25% and most preferably of 10-20%.

The aforementioned fat preferably has a solid fat content at 35° C. ($N_{35}$) of 0-10%, more preferably of 0-5% and most preferably of 0-3%.

The fat preferably exhibits a difference in solid fat content at 20° C. and 35° C. ($N_{20}$-$N_{35}$) of at least 5%, more preferably of at least 8%, most preferably of at least 10%.

The fat in the structured continuous fat phase preferably contains at least 50 wt. %, more preferably at least 80 wt. % and most preferably at least 90 wt. % triglycerides.

In accordance with a particularly preferred embodiment, the structured continuous fat phase contains not more than 5 wt. %, more preferably not more than 4 wt. %, more preferably not more than 3 wt. % and most preferably not more than 2.5 wt. % of the particulate anhydrous non-defibrillated cell wall material. The concentration of said particulate cell wall material in the structured continuous fat phase preferably is at least 0.1 wt. %, more preferably at least 0.2 wt. % and most preferably at least 0.3 wt. %.

Calculated by weight of the liquid oil that is present in the fat of the structured continuous fat phase, said fat phase preferably contains not more than 8 wt. %, more preferably not more than 6 wt. %, even more preferably not more than 4 wt. % and most preferably not more than 3 wt. % of the particulate anhydrous non-defibrillated cell wall material. Again, calculated by weight of the liquid oil that is present in the fat of the structured continuous fat phase, the concentration of the particulate cell wall material in the structured continuous fat phase preferably is at least 0.2 wt. %, more preferably at least 0.3 wt. % and most preferably at least 0.4 wt. %.

The oil-continuous composition of the present invention preferably contains, calculated by weight of the liquid oil, at least 0.3 wt. %, more preferably at least 0.4 wt. % and most preferably at least 0.45 wt. % of particulate anhydrous non-defibrillated cell wall material having a particle size between 40 μm and 300 μm.

The particulate anhydrous non-defibrillated cell wall material of the present invention contains not more than 15 wt. % water. Preferably the water content of said particulate cell wall material is less than 12 wt. %, more preferably less than 9 wt. % and most preferably less than 7 wt. %.

The particulate cell wall material of the present invention may comprise both primary cell wall material and secondary cell wall material. Preferably, at least 85 wt. %, more preferably at least 90 wt. % and most preferably at least 95 wt. % of said particulate cell wall material is primary cell wall material.

Primary plant cell walls contain not more than a minor amount of lignin, if at all. The particulate anhydrous cell wall material preferably contains less than 10 wt. %, more preferably less than 3 wt. % and most preferably less than 1 wt. % lignin.

The particulate anhydrous non-defibrillated cell wall material employed in accordance with the present invention preferably originates from fruit, bulb, root, tuber, leave, and/or stem tissue. More preferably, the particulate anhydrous non-defibrillated cell wall material originates from one or more plant sources selected from carrot, aubergine, cucumber, sugar beet, apple, leek, pear, pumpkin, kiwi, strawberry, papaya, pine apple, prune, melon, apricot, grapes onion, tomato, potato, coconut. Even more preferably, said particulate cell wall material originates from carrot, aubergine, cucumber, sugar beet, apple, pear, potato, leek and/or onion. Most preferably, the particulate cell wall material originates from carrot or aubergine.

The inventors have discovered that particulate cell wall material that can suitably be used to structure a fat phase can be produced from some plant materials, notably, aubergine, apple, leek, or cucumber, by simply comminuting parenchymal tissue from these plants, followed by drying of the comminuted material, preferably by freeze drying of the comminuted material. In the material so obtained, referred to hereinafter as "non-refined particulate cell wall material", pectin is abundantly present. Accordingly, the particulate cell wall materials obtained by this simple route are characterized by a relatively high molar ratio of galacturonic acid to glucose. In addition, these particulate cell wall materials contain appreciable levels of mono- and disaccharides.

In an embodiment of the invention, the non-refined particulate anhydrous non-defibrillated cell wall material originates from aubergine and contains:
  galacturonic acid and glucose in a molar ratio of at least 0.50, preferably of at least 0.55, most preferably of at least 0.60;
  at least 20 wt. %, preferably 25-50 wt. % of small saccharides selected from monosaccharides, disaccharides, trisaccharides and combinations thereof;
  0-15 wt. % water.

This non-refined particulate cell wall material from aubergine typically has a structuring value of at least 0.0015, more preferably of at least 0.0025 and most preferably of at least 0.0040 μm/μm$^3$.

The "structuring value" is determined by means of confocal scanning laser microscopy (CSLM) using the procedure that is specified in the Examples.

In an embodiment of the invention, the particulate non-refined anhydrous non-defibrillated cell wall material originates from cucumber and contains:
  galacturonic acid and glucose in a molar ratio of at least 0.45, preferably of at least 0.50, most preferably of at least 0.55;
  at least 25 wt. %, preferably 30-40 wt. % of small saccharides selected from monosaccharides, disaccharides, trisaccharides and combinations thereof;
  0-15 wt. % water.

This non-refined particulate cell wall material from cucumber typically has a structuring value of at least 0.0004, more preferably of at least 0.0005 and most preferably of at least 0.0006 μm/μm$^3$.

In an embodiment of the invention, the particulate non-refined anhydrous non-defibrillated cell wall material originates from leek and contains:
  galacturonic acid and glucose in a molar ratio of at least 0.50, preferably of at least 0.52, most preferably of at least 0.53;
  at least 10 wt. %, preferably 15-30 wt. % of small saccharides selected from monosaccharides, disaccharides, trisaccharides and combinations thereof;
  0-15 wt. % water.

This non-refined particulate cell wall material from leek preferably has a structuring value of at least 0.0025, more preferably of at least 0.0028 and most preferably of at least 0.0030 μm/μm$^3$.

In an embodiment of the invention, the particulate non refined anhydrous non-defibrillated cell wall material originates from apple and contains:
  galacturonic acid and glucose in a molar ratio of at least 0.55, preferably of at least 0.58, most preferably of at least 0.60;
  at least 50 wt. %, preferably 70-85 wt. % of small saccharides selected from monosaccharides, disaccharides, trisaccharides and combinations thereof;
  0-15 wt. % water.

This non-refined particulate cell wall material from apple preferably has a structuring value of at least 0.0005, more preferably of at least 0.0006 and most preferably of at least 0.0007 μm/μm$^3$.

As explained earlier, the particulate cell wall material that is employed in accordance with the present invention may suitably be produced from plant parenchymal tissue by (i) comminuting said tissue, (ii) subjecting the tissue to a heat treatment before, during or after comminution, (iii) extensively washing the heat treated and comminuted material with water, and (iv) drying the washed material. The particular cell wall material so obtained is referred to herein as "refined particulate cell wall material". Due to the removal of pectin during the washing step, the ratio of galacturonic acid to glucose in the polysaccharide component of the starting material (plant parenchymal tissue) is reduced substantially. Accordingly, in a preferred embodiment, the refined particulate cell wall material contains galacturonic acid and glucose in a molar ratio of less than 0.60, more preferably of less than 0.55, even more preferably of less than 0.50.

In an embodiment of the invention, the refined particulate anhydrous non-defibrillated cell wall material originates from carrot and contains:
  galacturonic acid and glucose in a molar ratio of less than 0.9, preferably of less than 0.8, most preferably of less than 0.7;
  0-1 wt. %, more preferably 0-0.5 wt. %, most preferably 0-0.1 wt. % of small saccharides selected from monosaccharides, disaccharides, trisaccharides and combinations thereof;
  0-15 wt. % water.

This refined particulate cell wall material from carrot preferably has a structuring value of at least 0.0020, more preferably of at least 0.0040 and most preferably of at least 0.0050 $\mu m/\mu m^3$.

In an embodiment of the invention, the refined particulate anhydrous non-defibrillated cell wall material originates from aubergine and contains:
  galacturonic acid and glucose in a molar ratio of less than 0.6, preferably of less than 0.5, most preferably of less than 0.4;
  0-1 wt. %, more preferably 0-0.5 wt. %, most preferably 0-0.1 wt. % of small saccharides selected from monosaccharides, disaccharides, trisaccharides and combinations thereof;
  0-15 wt. % water.

This refined particulate cell wall material from aubergine preferably has a structuring value of at least 0.0040, more preferably of at least 0.0050 and most preferably of at least 0.0060 $\mu m/\mu m^3$.

In an embodiment of the invention, the refined particulate anhydrous non-defibrillated cell wall material originates from cucumber and contains:
  galacturonic acid and glucose in a molar ratio of less than 0.5, preferably of less than 0.48, most preferably of less than 0.45;
  0-1 wt. %, more preferably 0-0.5 wt. %, most preferably 0-0.1 wt. % of small saccharides selected from monosaccharides, disaccharides, trisaccharides and combinations thereof;
  0-15 wt. % water.

This refined particulate cell wall material from cucumber preferably has a structuring value of at least 0.0030, more preferably of at least 0.0040 and most preferably of at least 0.0050 $\mu m/\mu m^3$.

In an embodiment of the invention, the refined particulate anhydrous non-defibrillated cell wall material originates from apple and contains:
  galacturonic acid and glucose in a molar ratio of less than 0.5, preferably of less than 0.48, most preferably of less than 0.45;
  0-1 wt. %, more preferably 0-0.5 wt. %, most preferably 0-0.1 wt. % of small saccharides selected from monosaccharides, disaccharides, trisaccharides and combinations thereof;
  0-15 wt. % water.

This refined particulate cell wall material from apple preferably has a structuring value of at least 0.0015, more preferably of at least 0.0020 and most preferably of at least 0.0040 $\mu m/\mu m^3$.

In an embodiment of the invention, the refined particulate anhydrous non-defibrillated cell wall material originates from leek and contains:
  galacturonic acid and glucose in a molar ratio of less than 0.5, preferably of less than 0.48, most preferably of less than 0.45;
  0-1 wt. %, more preferably 0-0.5 wt. %, most preferably 0-0.1 wt. % of small saccharides selected from monosaccharides, disaccharides, trisaccharides and combinations thereof;
  0-15 wt. % water.

This refined particulate cell wall material from leek preferably has a structuring value of at least 0.0040, more preferably of at least 0.0050 and most preferably of at least 0.0055 $\mu m/\mu m^3$.

In an embodiment of the invention, the refined particulate anhydrous non-defibrillated cell wall material originates from onion and contains:
  galacturonic acid and glucose in a molar ratio of less than 0.55, preferably of less than 0.5, most preferably of less than 0.47;
  0-1 wt. %, more preferably 0-0.5 wt. %, most preferably 0-0.1 wt. % of small saccharides selected from monosaccharides, disaccharides, trisaccharides and combinations thereof;
  0-15 wt. % water.

This refined particulate cell wall material from onion preferably has a structuring value of at least 0.0018, more preferably of at least 0.0030 and most preferably of at least 0.0040 $\mu m/\mu m^3$.

In an embodiment of the invention, the refined particulate anhydrous non-defibrillated cell wall material originates from pear and contains:
  galacturonic acid and glucose in a molar ratio of less than 0.55, preferably of less than 0.50, most preferably of less than 0.45;
  0-1 wt. %, more preferably 0-0.5 wt. %, most preferably 0-0.1 wt. % of small saccharides selected from monosaccharides, disaccharides, trisaccharides and combinations thereof;
  0-15 wt. % water.

This refined particulate cell wall material from pear preferably has a structuring value of at least 0.0014, more preferably of at least 0.0020 and most preferably of at least 0.0040 $\mu m/\mu m^3$.

In an embodiment of the invention, the refined particulate anhydrous non-defibrillated cell wall material originates from sugar beet and contains:
  galacturonic acid and glucose in a molar ratio of less than 0.5, preferably of less than 0.48, most preferably of less than 0.46;
  0-1 wt. %, more preferably 0-0.5 wt. %, most preferably 0-0.1 wt. % of small saccharides selected from monosaccharides, disaccharides, trisaccharides and combinations thereof;
  0-15 wt. % water.

This refined particulate cell wall material from sugar beet preferably has a structuring value of at least 0.0025, more preferably of at least 0.0035 and most preferably of at least 0.0050 $\mu m/\mu m^3$.

In an embodiment of the invention, the refined particulate anhydrous non-defibrillated cell wall material originates from potato and contains:

0-25 wt. %, preferably 0-10 wt. % and more preferably 0-5 wt. % starch;

0-1 wt. %, more preferably 0-0.5 wt. %, most preferably 0-0.1 wt. % of small saccharides selected from monosaccharides, disaccharides, trisaccharides and combinations thereof;

0-15 wt. % water.

This refined particulate cell wall material from potato preferably has a structuring value of at least 0.0030, more preferably of at least 0.0035 and most preferably of at least 0.0050 µm/µm$^3$.

The dispersed aqueous phase of the present emulsion typically contains at least 80 wt. % water. Besides water, this aqueous phase may contain one or more ingredients selected from milk powder, skim milk powder, whey protein, casein, sodium caseinate, flavouring, water-soluble vitamins, minerals, preservative, acidulant, thickening agent and gelling agent.

According to a particularly preferred embodiment, the water-in-oil emulsion of the present invention is obtainable by, more preferably obtained by a process of preparing an oil-continuous composition as described herein.

Likewise, it is preferred that the particulate cell wall material that is contained in the water-in-oil emulsion is obtainable by, more preferably obtained by a method of preparing particulate anhydrous non-defibrillated cell wall material as described herein.

Another aspect of the present invention relates to a process of preparing a water-in-oil emulsion, said process comprising:

preparing a pre-emulsion by mixing molten fat and aqueous liquid, said fat having a solid fat content at 20° C. ($N_{20}$) of 5-50% and a liquid oil content at 20° C. that equals 100%-$N_{20}$;

cooling the pre-emulsion to a temperature that is at least 5° C. below the slip melting point of the fat;

mixing the cooled pre-emulsion with particulate anhydrous non-defibrillated cell wall material from plant parenchymal tissue;

wherein the particulate cell wall material has a bulk density of less than 50 g/l, preferably of less than 30 g/l, more preferably of less than 25 g/l, even more preferably of less than 20 g/l and most preferably of less than 18 g/l; wherein at least 90 wt. % of said particulate cell wall material has a particle size between 25 µm and 500 µm; and wherein the particulate cell wall material is mixed with the pre-emulsion in an amount of 0.1 to 10 parts by weight per 100 parts by weight of liquid oil.

The present process preferably employs particulate anhydrous non-defibrillated cell wall material as defined herein before. Likewise, also the fat employed preferably is a fat as defined herein before.

The mixing of the cooled pre-emulsion with the particulate cell wall material may be achieved in different ways. In one embodiment, the particulate cell wall material is in the form of a powder when it is mixed with the pre-emulsion. In accordance with another embodiment, the particulate cell wall material is first mixed with fat and the combination of fat and particulate cell wall material is then mixed with the cooled pre-emulsion.

The process according to the invention preferably produces a water-in-oil emulsion as defined herein before.

The pre-emulsion typically contains 23-89.9 wt. % of fat phase and 10.1-77 wt. % of aqueous phase. More preferably, the pre-emulsion contains 25-84.8 wt. % of fat phase and 15.2-75 wt. % of aqueous phase.

The combination of fat phase and aqueous phase typically constitutes at least 90 wt. %, more preferably at least 98 wt. % and most preferably 100 wt. % of the pre-emulsion.

The present process may start with a pre-emulsion in the form of a water-in-oil emulsion or an oil-in-water emulsion. In case the process is used to produce water-in-oil emulsion having a low fat content, e.g. a fat content of 40 wt. %, it can be advantageous to prepare a pre-emulsion in the form of an oil-in-water emulsion and to 'invert' this emulsion to a water-in-oil emulsion during the cooling of the pre-emulsion.

The pre-emulsion is preferably cooled using a scraped surface heat exchanger. Scraped surface heat exchangers offer the advantage that they enable rapid cooling of oil-and-water emulsions.

The pre-emulsion is preferably rapidly cooled to a temperature that is low enough to initiate rapid fat crystallisation. According to a particularly preferred embodiment the pre-emulsion is cooled to a temperature t at which the fat in the pre-emulsion has a solid fat content ($N_t$) of at least 10%, more preferably at least 12% and most preferably 15-40%. By rapidly cooling the pre-emulsion to the aforementioned temperature it is possible to mix the cooled pre-emulsion with the particulate cell wall material when the pre-emulsion is still in a liquid or semi-liquid state. During and after the mixing, the crystallization of the fat component continues until the combination of the solidified fat and the particulate cell wall materials produces a structured continuous fat phase that renders the water-in-oil emulsion solid or semi-solid.

According to a particularly preferred embodiment, when it is mixed with the particulate cel wall material, the cooled pre-emulsion has a temperature that is at least 5° C., more preferably at least 10° C. and most preferably at least 20° C. below the slip melting point of the fat.

Mixing of the cooled pre-emulsion with the particulate cell wall material is preferably done using a continuous mixer, e.g. a pin stirrer. The particulate cell wall material preferably is homogeneously distributed throughout the pre-emulsion by the mixing before the product has lost its pumpability.

Preferably, the present process comprises mixing 100 parts by weight of the cooled pre-emulsion with 0.1-5 parts by weight, more preferably 0.2-4 parts by weight and most preferably 0.4-3 parts by weight of the particulate cell wall material.

In accordance with another preferred embodiment, the process comprises mixing 100 parts by weight of the cooled pre-emulsion with at least 0.1 parts by weight, more preferably at least 0.2 parts by weight, most preferably at least 0.4 parts by weight of particulate anhydrous non-defibrillated cell wall material having a bulk density of less than 50 g/l and at least 90 wt. % of said particulate anhydrous non-defibrillated cell wall material having a particle size between 40 µm and 300 µm.

The particulate cell wall material employed in the present process preferably originates from carrot, aubergine, cucumber, sugar beet, apple, pear, potato, leek and/or onion. These materials typically have a very low bulk density. Depending on the origin of the particulate cell wall material, the preferred bulk densities are as follows:

Carrot: less than 20 g/l, more preferably less than 15 g/l

Aubergine: less than 15 g/l, more preferably less than 10 g/l

Cucumber: less than 12 g/l, more preferably less than 8 g/l

Apple: less than 15 g/l, more preferably less than 10 g/l

Leek: less than 20 g/l, more preferably less than 12 g/l

Onion: less than 20 g/l, more preferably less than 15 g/l
Pear: less than 20 g/l, more preferably less than 12 g/l
Sugar beet: less than 20 g/l, more preferably less than 12 g/l
Potato: less than 12 g/l, more preferably less than 10 g/l The particulate cell wall material employed in the present process typically contains not more than a limited amount of water soluble salt. Accordingly, when dispersed in demineralised water in a concentration of 3 wt. % the particulate cell wall material produces a suspension having a conductivity of less than 250 μS/cm, preferably of less than 100 μS/cm.

According to another preferred embodiment, the particulate cell wall material employed in the present invention produces a structured fat phase having a shear storage modulus G' at 20° C. of at least 5,000 Pa, more preferably of at least 8,000 Pa and most preferably of at least 10,000 Pa when said material is dispersed through sunflower oil in a concentration of 3 wt. %.

It is further preferred that the particulate cell wall material that is employed in the present process is obtainable by, more preferably obtained by a method of preparing particulate anhydrous non-defibrillated cell wall material as described herein.

A further aspect of the present invention relates to the use of the particulate anhydrous non-defibrillated cell wall material for replacing high melting (hard stock) fat in water-in-oil emulsions, said particulate anhydrous non-defibrillated cell wall material having a bulk density of less than 50 g/l and at least 90 wt. % of said particulate anhydrous non-defibrillated cell wall material having a particle size between 25 μm and 500 μm. Preferably, the particulate cell wall material is used to replace high melting fat in a water-in-oil emulsion in the form of a spread, a kitchen margarine or a bakery margarine.

Yet another aspect of the invention relates to a method of preparing particulate anhydrous non-defibrillated cell wall material having a bulk density of less than 50 g/l, at least 90 wt. % of said particulate anhydrous non-defibrillated cell wall material having a particle size between 25 μm and 500 μm, said method comprising:
  providing plant material having a water content of at least 50 wt. % and comprising parenchymal tissue from plant material selected from carrot, aubergine, cucumber, sugar beet, leek, apple, pear, pumpkin, kiwi, strawberry, *papaya*, pine apple, prune, melon, apricot, grapes onion, tomato, potato, coconut and combinations thereof, said parenchymal tissue providing at least 80 wt. % of the dry matter in the starting material;
  heating the plant material to a temperature 'T' exceeding $T_{min}$ of 70° C. during a time period 't' wherein temperature T (in ° C.) and the time period t (in minutes) meet the following equation:

$$t > 1200/(T-69)^{1.4};$$

washing the heated plant material or a fraction of the heated plant material with water to reduce the concentration of monosaccharides to less than 10% by weight of dry matter, said monosaccharides being selected from glucose, fructose and combinations thereof; and
  drying the washed plant material;
  wherein the plant material is comminuted before the washing step to produce a pulp.

It is noted that plant material having a water content of at least 50 wt. % may be provided in the form of reconstituted dry plant material.

Preferably, the present method of preparing a particulate cell wall material produces a particulate anhydrous non-defibrillated cell wall material as defined herein before.

The plant material employed in the present method is preferably selected from carrot, aubergine, cucumber, sugar beet, apple, pear, potato, tomato, onion and combinations thereof.

According to a particularly preferred embodiment of the present process $T_{min}$ is 75° C.

Even more preferably $T_{min}$ is 80° C., especially 90° C. and most preferably 100° C.

Typically, the temperature 'T' employed in the present process does not exceed 150° C., more preferably it does not exceed 120° C. and most preferably it does not exceed 102° C.

The heating period 't' preferably exceeds 1 minute, more preferably it exceeds 2 minutes. Most preferably, the heating period t is in the range of 3-120 minutes.

The plant material that is heated in the present process typically contains 10-40% water-insoluble material by weight of dry matter. More preferably, this plant material contains 15-40% and most preferably 20-40% water-insoluble material by weight of dry matter.

The plant material that is heated in the present process typically contains 3-75% monosaccharides by weight of dry matter, said monosaccharides being selected from glucose, fructose and combinations thereof. In case the plant material contains fruit, monosaccharides are typically contained therein in a concentration of 25-85%, most preferably of 30-80% by weight of dry matter.

Due to the washing step of the present method the concentration of the aforementioned monosaccharides in the plant material is typically reduced to less than 10% by weight of dry matter, more preferably less than 5% by weight of dry matter and most preferably to less than 3% by weight of dry matter.

The washing step of the present process advantageously employs in total at least 50 litres of water per kg of dry matter that is contained in the material that is subjected to the washing step. More preferably, at least 100 litres, even more preferably at least 200 litres, especially at least 400 litres and most preferably at least 800 litres of water are employed in the washing per kg of dry matter contained in the material that is subjected to the washing step.

The washed plant material is preferably dried to a water content of less than 15 wt. %, more preferably a water content of less than 10 wt. %, and most preferably of less than 7 wt. %.

Drying techniques that may suitably be employed to dry the washed plant material include freeze drying, drum drying, solvent exchange, extrusion drying. Most preferably, the washed plant material is dried by means of freeze drying.

According to another particularly preferred embodiment, before the washing step, the heated plant material is subjected to shear by using industrial shear devices like Silverson, Turrax or Thermomix, high pressure homogenisation and Microfluidiser. Suitable operating conditions are specified below:
  HPH: 100-2000 bar
  Microfluidiser: 500-2,000 bar.
  Silverson: 4,000-8,000 rpm
  Ultra Turrax: tipspeed of 10-23 m/s
  Thermomix (speed 2-10)

The homogenization of the heated plant material prior to the washing step ensures that most of the cell walls are ruptured and that water-soluble components can more easily be removed during the washing step.

The invention is further illustrated by means of the following non-limiting examples.

EXAMPLES

Example 1

Fresh apples (Jonagold) and carrots were cut in small pieces (ca. 1×1×1 cm$^3$), cooked in boiling water until the particles had become soft, and pureed using a handheld blender. Low molecular weight sugars, minerals and soluble pectin were removed by washing the puree with 600 liters of water per kg of dry matter. Puree was dispersed in water, centrifuged and the sediment (containing non-soluble cell wall material) was collected; the supernatant phase (containing soluble components) was discarded. The washing step was repeated three times. The sediment phase was redispersed in demineralized water and added drop-wise to ca. 10 liter of liquid nitrogen contained in a polystyrene box using a 50 ml syringe. The frozen particles were collected, freeze dried and ground.

Water-in-oil emulsions were prepared using the following procedure:
  i) Preparation of aqueous phase: NaCl and potassium sorbate were dissolved in Millipore water. pH was adjusted to 4.8 using 1 N HCl.
  ii) Preparation of pre-emulsion: aqueous phase was emulsified into liquid fat using a Silverson high-shear mixer equipped with a fine emulsor screen operated at 7000 rpm. The liquid fat had the following composition (per 100 gram): 87.87 g rapeseed oil, 3.00 g RPh70 (=fully hardened rapeseed fat), 0.30 g citrem, 0.03 g beta-carotene, 0.8 g salt and 8.0 g butter olein.
  iii) Preparation of cell wall material-fat mixture: an interesterified blend of multi-fractionated palm stearin and palm kernel oil was mixed with sunflower oil and the mixture was heated in a microwave oven to ca. 80° C. Freeze dried carrot or apple cell wall material was dispersed in the hot fat mixture manually using a spatula. The hot mixture was then transferred to a double-walled, stirred vessel connected to a low-temperature cryostat bath (bath temperature was 5° C.). The stirring device consisted of a stirring blade with a helical shape and a scraping vane. The fat/plant particle mixture was stirred at 100 rpm for 5 minutes; after 5 minutes the temperature of the mixture had decreased to ca. 12° C.
  iv) Combining emulsion and cell wall material-fat mixture: the emulsion prepared in step ii and the cell wall material/fat mixture prepared in step iii were mixed in a 1:1 ratio using a hand-held kitchen mixer. Samples were stored in plastic jars (diameter=52 mm, volume ca. 100 ml) at 5° C.

Table 1 shows the composition of emulsions with carrot (Example 1.1) and apple (Example 1.2) cell wall material and a reference sample (Example 1.A) without cell wall material.

TABLE 1

|  | Emulsion 1.1 g/100 g | Emulsion 1.2 g/100 g | Emulsion 1.A g/100 g |
|---|---|---|---|
| Aqueous phase |  |  |  |
| Water | 19.75 | 19.75 | 19.75 |
| NaCl | 0.2 | 0.2 | 0.2 |
| Potassium sorbate | 0.05 | 0.05 | 0.05 |
| Oil phase |  |  |  |
| Carrot CWM | 1.6 | — | — |
| Apple CWM | — | 1.6 | — |
| Sunflower oil | 42.9 | 42.9 | 44.5 |
| Interesterified blend | 5.5 | 5.5 | 5.5 |
| Rapeseed oil blend | 30 | 30 | 30 |

Texture analysis was performed using a Brookfield Texture Analyzer CT3 equipped with a cylindrical probe (probe diameter=0.25 inch/6.35 mm; probe speed=2 mm/s; maximum deformation=25 mm; trigger value=1 gram). The following parameters were recorded: peak load (maximum load measured during the test), final load (load at maximum deformation) and work (area under the force-deformation curve). The samples (80 gram) were contained in round plastic jars (diameter=52 mm, volume ca. 100 ml). Measurements were performed after storing the samples for 28 days at 5° C.; measurement temperature was 5° C. Results of the texture analysis test are shown in Table 2.

TABLE 2

|  | Peak load (g) | Final load (g) | Work (mJ) |
|---|---|---|---|
| Emulsion 1.1 | 59.4 ± 0.7 | 57.3 ± 1.6 | 10.6 ± 0.8 |
| Emulsion 1.2 | 39.0 ± 2.1 | 38.2 ± 3.1 | 7.6 ± 0.1 |
| Emulsion 1.A | 26.1 ± 0.2 | 24.8 ± 2.1 | 4.3 ± 0.2 |

Example 2

Carrot cell wall material was prepared as described in Example 1.

Emulsions containing this cell wall material were prepared using the following procedure:
  i) Preparation of aqueous phase: butter milk powder, salt, citric acid and potassium sorbate were dissolved in Millipore water
  ii) Preparation of fat phase: a fat blend containing dry-fractionated palm oil stearin, hydrolyzed sunflower lecithin and monoglycerides (Dimodan HP) were dispersed in rapeseed oil and heated in a microwave oven to ca. 80° C.
  iii) Preparation of emulsion: aqueous phase was slowly added into the hot fat phase using a high shear Silverson mixer equipped with a fine emulsor screen operated at 7000 rpm
  iv) Cooling of the emulsion: the emulsion was cooled in a lab-scale single screw extruder unit connected to a cryostat bath (bath temperature was 5° C.). The throughput was 5 kg per hour. Temperature of emulsion leaving the extruder unit was ca. 15° C.
  v) Addition of cell wall material: carrot cell wall material was mixed into the emulsion directly after extrusion using a hand-held kitchen mixer. Emulsion samples (190 gram) were stored in a plastic tubs (l*w*h=11.2*7.2*3.5 cm$^3$) at 5° C. until analysis.

Table 3 shows the composition of an emulsion with carrot cell wall material (Emulsion 2.1) and a reference sample (Emulsion 2.A) without cell wall material.

TABLE 3

|  | Emulsion 2.1 g/100 g | Emulsion 2.A g/100 g |
|---|---|---|
| Aqueous phase | | |
| Water | 30.73 | 31.06 |
| butter milk powder | 0.42 | 0.43 |
| NaCl | 0.32 | 0.32 |
| citric acid | 0.07 | 0.07 |
| potassium sorbate | 0.04 | 0.04 |
| Oil phase | | |
| carrot cell wall material | 1.05 | — |
| rapeseed oil | 48.35 | 48.86 |
| fat blend + dfPOs | 18.60 | 18.80 |
| hydrolyzed sunflower lecithin | 0.32 | 0.32 |
| monoglycerides (Dimodan HP) | 0.11 | 0.11 |

Emulsion stability was evaluated in a temperature cycle test. Emulsions were stored in a temperature controlled cabinet using the following time-temperature conditions:

T=15° C. (14 days)—30° C. (2 days)—15° C. (4 days)—10° C. (1 day)—30° C. (1 day)—10° C. (1 day)—30° C. (1 day)—10° C. (1 day)—30° C. (1 day)—10° C. (2 days).

Samples were visually inspected after temperature cycling for signs of instability such as oil exudation or water release. Samples containing carrot cell wall material (Emulsion 2.1) did not show any signs of instability. By contrast, the reference sample without carrot cell wall material (Emulsion 2.A) did show significant oil exudation after temperature cycling.

Example 3

154 g finely cut press cake residue from carrot juice production (26% DM, stored frozen) was dispersed in just boiled demineralized water (total weight 1.5 kg, 2.7% DM). The sample was heated in a microwave oven and pureed in a Thermomix. The sample was washed with 4 liter demineralized water using filter cloth and the residue was redispersed in demineralized water (1.5 kg total mass). The sample was sheared using a Silverson mixer, heated in a Thermomix (30 min at 90° C.), washed with 2 L demineralized water and sheared again (Silverson mixer with fine emulsor screen, 10 minutes at 7000 rpm). The dispersion was washed on Miracloth filter with 1 liter demineralized water. The residue was collected and redispersed in demineralized water. 300 gram dispersion was homogenized at 500 bar using a high pressure homogenizer. The sample was washed on Miracloth filter using 1 liter demineralized water. The residue was collected and redispersed in demineralized water (300 g total weight). The suspension was added dropwise to liquid nitrogen, quickly frozen and freeze dried.

543 g chopped aubergine was added to 1.6 kg hot water, heated in a microwave oven until boiling and pureed in a Thermomix food processor. Pureed aubergine was collected and water-soluble compounds were removed by washing with 6 liter demineralized water. The washed puree was redispersed in 1.5 liter demineralized water, sheared using a high-shear Silverson mixer and homogenized at 1500 bar. The puree was then poured onto a pre-cooled metal plate, frozen at −80° C. and freeze dried. Freeze-dried aubergine particles were collected and milled in a Waring blender.

Fresh cucumbers were peeled and chopped into pieces of approximately 1×1×1 cm$^3$. The pieces were transferred to a polystyrene box containing liquid nitrogen and quickly frozen. The freeze-dried particles were ground using a kitchen blender.

Emulsions were prepared using the procedure of Example 2. Emulsion samples were stored in plastic tubs (l*w*h=11.2*7.2*3.5 cm$^3$) at 5° C. until analysis.

Table 4 shows the composition of emulsions with carrot (Emulsion 3.1), aubergine (Emulsion 3.2) and cucumber (Emulsion 3.3) cell wall material and a reference sample (Emulsion 3.A) without cell wall material.

TABLE 4

|  | Emulsion 3.1 g/100 g | Emulsion 3.2 g/100 g | Emulsion 3.3 g/100 g | Emulsion 3.A g/100 g |
|---|---|---|---|---|
| Aqueous phase | | | | |
| Water | 28.79 | 28.79 | 28.17 | 29.20 |
| butter milk powder | 0.39 | 0.39 | 0.39 | 0.40 |
| NaCl | 0.30 | 0.30 | 0.29 | 0.30 |
| citric acid | 0.06 | 0.06 | 0.06 | 0.07 |
| potassium sorbate | 0.04 | 0.04 | 0.04 | 0.04 |
| Oil phase | | | | |
| carrot CWM | 1.38 | — | — | — |
| aubergine CWM | — | 1.38 | — | — |
| Cucumber | — | — | 3.50 | — |
| rapeseed oil | 51.05 | 51.05 | 49.95 | 51.76 |
| fat blend/ + dfPOs | 17.51 | 17.51 | 17.13 | 17.75 |
| hydrolyzed SF lecithin | 0.30 | 0.30 | 0.29 | 0.30 |
| Dimodan HP | 0.10 | 0.10 | 0.10 | 0.10 |
| 1% beta carotene | 0.09 | 0.09 | 0.09 | 0.09 |

Results of texture analysis test (using protocol described above) are shown in Table 5.

TABLE 5

| Emulsion | Peak load (g) | Final load (g) | Work (mJ) |
|---|---|---|---|
| 3.1 | 156.1 ± 1.7 | 149.2 ± 6.3 | 32.7 ± 1.3 |
| 3.2 | 161.6 ± 3.8 | 150.0 ± 9.7 | 34.5 ± 0.1 |
| 3.3 | 120.9 ± 1.0 | 119.6 ± 2.1 | 23.0 ± 1.2 |
| 3.A | 129.8 ± 2.9 | 114.0 ± 5.4 | 24.9 ± 0.4 |

Assessment of Temperature Stability

Emulsion stability was evaluated in a temperature stability test. Emulsions were stored in a temperature controlled cabinet at 32° C. for 2 days and inspected visually for signs of instability. Samples containing carrot cell wall material (Emulsion 3.1), aubergine (Emulsion 3.2) and cucumber (Emulsion 3.3) did not show any signs of instability after 2 days at 32° C. By contrast, the reference sample without cell wall material (Emulsion 3.A) did show significant oil exudation.

Example 4

Carrot and aubergine cell wall material was prepared as described in Example 3. Apple cell wall material was prepared as described in Example 1.

Freeze dried powders were produced from comminuted leek (white part only). To 280 g leek that had been cut in small pieces, 520 g demineralised boiled water was added, followed by and heating in a microwave until boiling (2 min 150 W), shearing (using Thermomix for 90 min at 90° C. at speed 3-4), and washing with 3 L demineralized water using Miracloth filter. The residue was collected and sheared using a Silverson mixer and was washed again using Miracloth filter with 1 liter demineralized water. The residue was collected and redispersed in demineralized water and homogenized at 500 bar using a high pressure homogenizer.

The sample was washed on Miracloth filter using demineralized water (1 L). The residue was dropwise quickly frozen in liquid nitrogen and freeze dried.

Freeze dried powders were produced from comminuted cucumber. Fresh cucumbers were peeled and cut into small pieces. 896 g of the chopped cucumber was added to 1.6 kg hot Millipore water (ca. 90° C.), heated in a microwave (7 min, 1000 W) until boiling and pureed in a Thermomix (speed dial position 3, duration: 30 minutes, temperature: 90° C.). Water soluble compounds were removed from the cucumber puree by washing with demineralized water (6 L) using a filter cloth (Miracloth, pore size 25 micrometer). The washed puree was dispersed in 1.35 kg demineralized water and sheared twice using a high-shear Silverson mixer. The first shear treatment (5 min, 5000 rpm) was performed using a high shear screen with large square holes (ca. 2.8×2.8 mm); in the second shear treatment (10 min, 7000 rpm) an emulsor screen with small spherical holes (ca. 2.0 mm diameter mm) was used. The sample was washed (5 L) using a filter cloth (Miracloth, pore size 25 micrometer) to remove small compounds. Part (600 g) of the sample was transferred to a high-pressure homogenizer (GEA Niro Soavi, Panda Plus) and homogenized at a pressure of 500-600 bar. The sample was extra washed (2 L) using a filter cloth (Miracloth, pore size 25 micrometer). The sample was frozen in liquid nitrogen prior to freeze drying.

Emulsions containing cell wall material were prepared using the following procedure:
i) Preparation of aqueous phase: butter milk powder, salt, citric acid and potassium sorbate were dissolved in Millipore water
ii) Preparation of fat phase: a fat blend containing dry-fractionated palm oil stearin, hydrolyzed sunflower lecithin and monoglycerides (Dimodan HP) were dispersed in rapeseed oil and heated in a microwave oven to ca. 80° C.
iii) Preparation of emulsion: aqueous phase was slowly added into the hot fat phase using a high shear Silverson mixer equipped with a fine emulsor screen operated at 7000 rpm
iv) Cooling of the emulsion: the emulsion was cooled in a lab-scale surface scraped heat exchanger connected to a cryostat bath (bath temperature was −15° C.). Outlet temperature of the emulsion was ca. 3° C.
v) Addition of cell wall material: cell wall material was mixed into the emulsion directly after extrusion using a hand-held kitchen mixer. Emulsion samples (80 gram) were stored in a plastic jars (diameter=52 mm, volume 100 ml) at 5° C. until analysis.

Table 6 shows the composition of emulsions with carrot (Emulsion 4.1), aubergine (Emulsion 4.2), leek (Emulsion 4.3), cucumber (Emulsion 4.4) and apple (Emulsion 4.5) cell wall material and a reference sample (Emulsion 4.A) without cell wall material.

TABLE 6

| | Emulsions 4.1-4.5 g/100 g | Emulsion 4.A g/100 g |
|---|---|---|
| Aqueous phase | | |
| Water | 28.79 | 29.20 |
| butter milk powder | 0.39 | 0.40 |
| NaCl | 0.30 | 0.30 |
| citric acid | 0.07 | 0.07 |
| potassium sorbate | 0.04 | 0.04 |
| Oil phase | | |

TABLE 6-continued

| | Emulsions 4.1-4.5 g/100 g | Emulsion 4.A g/100 g |
|---|---|---|
| cell wall material | 1.40 | — |
| rapeseed oil | 58.94 | 59.78 |
| fat blend + dfPOs | 9.59 | 9.73 |
| hydrolyzed SF lecithin | 0.30 | 0.30 |
| Dimodan HP | 0.10 | 0.10 |
| 1% beta carotene | 0.09 | 0.09 |

Results of texture analysis test (using protocol described above) are shown in Table 7.

TABLE 7

| Emulsion | Peak load (g) | Final load (g) | Work (mJ) |
|---|---|---|---|
| 4.1 | 19.7 ± 0.7 | 17.9 ± 0.7 | 3.2 ± 0.1 |
| 4.2 | 17.7 ± 0.7 | 16.4 ± 1.4 | 2.2 ± 0.2 |
| 4.3 | 27.0 ± 1.1 | 26.6 ± 1.1 | 3.0 ± 0.1 |
| 4.4 | 29.5 ± 1.5 | 28.9 ± 1.5 | 5.0 ± 0.3 |
| 4.5 | 41.2 ± 1.0 | 39.5 ± 2.2 | 7.4 ± 0.2 |
| 4.A | 19.3 ± 0.2 | 18.9 ± 0.4 | 3.1 ± 0.1 |

Assessment of Temperature Stability

Emulsion stability was evaluated in a temperature stability test. Emulsions were stored in a temperature controlled cabinet at 25° C. for 2 days and inspected visually for signs of instability. Samples containing carrot (Emulsion 4.1), aubergine (Emulsion 4.2) or apple (Emulsion 4.5) cell wall material did not show any signs of instability after 2 days at 25° C. Samples containing leek or cucumber cell wall material showed slight oil exudation. By contrast, the reference sample without cell wall material (Emulsion 4.A) did show significant oil exudation.

Example 5

Finely cut press cake residue from carrot juice production was processed in the same way as in Example 3. This time not only the high pressure homogenized suspension, but also the finely cut press cake residue, the washed residue and the Silverson sheared suspension were freeze dried. Equal quantities (weight) of the powders so obtained were introduced into transparent jars. A picture of the jars containing the powders is shown in FIG. 1. From left to right this picture shows:
Freeze dried finely press cake residue
Freeze dried washed residue
Freeze dried Silversion sheared suspension
Freeze dried Silverson & HPH sheared suspension Example 6

Some of the freeze dried powders of Examples 1, 2, 3 and 4 were analysed. For each of these powders the molar ratio of galacturonic acid to glucose was determined after full hydrolysis of the polysaccharide and oligosaccharide component. In addition, the bulk density and the oil structuring values were determined using the methodology described below.

Measurement of Bulk Density

Bulk density of the freeze-dried particles was determined by measuring the weight of a known volume of sample. An excess amount of sample was gently introduced into a measuring cup (500 ml). Excess sample was carefully removed from the top of the cup using a flat blade. Care was taken to avoid compaction of the sample. The mass (M) of the powder was determined and the bulk density was calculated as M/V, where V is the volume of the measuring cup.

Measurement of Oil Structuring Value

Oil structuring values were assessed by confocal microscopy and image analysis.

Samples for confocal microscopy were prepared by adding 25 mg of a water-soluble fluorophore (Direct Yellow 96 ex Sigma Aldrich) to an aqueous suspension of particulate cell wall material containing 1 gram dry matter. The suspension was mixed well to assure complete dissolution of the Direct Yellow. Samples were then quickly frozen in liquid nitrogen and freeze dried. After freeze drying particles were dispersed in sunflower oil at 1% dry matter. Confocal microscopy was performed using a Leica TCS SP5 confocal system in combination with a DM16000 inverted microscope. The fluorescent dye was excited using the 458 nm laser line of an Argon ion laser at 25% of its maximum power and the AOTF set at 23%. Fluorescence was detected with PMT2 set at a wavelength range of 470-570 nm. The pinhole was set to 1 airy. Scanning was done at 400 Hz and 8 bit (values 0 to 255) data collection. The objective used was 40×HCX PL APO CS 40.0 NA 1.25 OIL UV, refraction index 1.52, no zoom was applied. Contrast during imaging was controlled by the detector gain and offset controls. The detector gain control was adjusted such that minimal overexposure occurs. No offset adjustment was required.

To enlarge the total acquired volume, tile scanning 2×2 was combined with the acquisition of a Z-stack. Four tiles of 1024×1024 pixels (greyscale) with a pixel size (in XY-direction) of 0.38 µm were acquired as a 2×2 matrix for each Z-plane position. The tiles were stitched together using an overlap of 10% yielding 1 slice. Z-axis acquisition steps were setup to be also 0.38 µm to obtain an isotropic voxel size. For the stacks a maximum of about 250-300 slices can be acquired, depending on the exact starting position, and the thickness of the droplet on the glass slide. At least 225 usable slices were acquired for each sample.

Stacks of greyscale images were pre-processed using Matlab R2016a in addition with DipLib library V2.8 (a Scientific Image Analysis Library from the Quantitative Imaging Group, Delft University of Technology 1995-2015). Noise was removed using a median filter. A size of 7 pixels (2D) and an elliptic shape was chosen which effectively removed noise and tiny speckles while retaining detail. To achieve consistency in the dynamic range for a set of data and enhance the contrast, a histogram stretch function was applied. This works by defining two brightness levels, a minimum and a maximum percentile. Contrast was maximized between those levels. This was done by moving all pixels darker than the minimum percentile to a brightness of 0, and all pixels brighter than the maximum percentile to a brightness of 255. Values in between the minimum and maximum were proportionately distributed in the range of 0 to 255. The minimum was set to the 50th percentile, and the maximum to the 99th percentile. The stretch was consistently applied to all images (slice by slice) in the stack. Next, each slice was binarised using an automatic ISO data method (black, or 0 is background, and white or 255 are features of interest). This method was determined by trying out four different automatic thresholding methods; Otsu, entropy, factorisation and iso-data. Except for the entropy method, the algorithms yielded stable values close to 80. The result was stored as a set of images in TIFF format.

Skeletonization of a stack of CSLM images, acquired using the method described above, allowed derivation of a distinctive parameter (total segment length [µm]/volume [µm$^3$]), which was used as a measure for coarseness of the structure of the dispersed plant material. A stack of binary TIFF images was imported into Avizo Fire software (from FEI/VSG, V9.0.1). The procedure "Auto-skeleton" was applied, which performs a series of operations on 3D shapes. A skeleton of a shape is a thin version of that shape that is equidistant to its boundaries (background). The Avizo module extracts the centerline of filamentous structures from the stack of image data by first calculating a distance map of the segmented volume. This map labels each pixel of the image with the distance to the nearest background pixel. Next, thinning was performed by removing voxel by voxel from the segmented object until only a string of connected voxels remains. This thinning was ordered according to the distance map input. The voxel skeleton was then converted to a spatial graph object. Two parameters influence the construction of the traced graph object. The "smooth" value is a coefficient that controls the influence of neighboring points on the position of a point. This parameter can take values greater than 0 and smaller than 1. The greater the value the smoother the result Spatial Graph becomes. A default value of 0.5 was used, together with an iteration value of 10. Another parameter named "attach to data" controls the influence of the initial coordinate on the new position. The higher the value the more the initial position will be retained. The default value of 0.25 was used. The distance to the nearest boundary (boundary distance map) was stored at every point in the spatial graph object as thickness attribute. This value was used as an estimate of the local thickness.

Visualizations of the skeleton were created which show these variations in local thickness; the segments of the graphs were drawn as tubes whose diameter (and color) depends on the thickness defined by the distance map (the distance to the nearest boundary was stored at every point in the Spatial Graph object as a thickness attribute). From the resulting graphs, the number of segments and the total length of these segments were calculated with the spatial graph statistics module. Next the total length was normalized for the imaged volume, and this value (total segment length [µm]/volume [µm$^3$]) was reported as oil structuring value.

The results of the analyses are shown in Table 8.

TABLE 8

| Plant origin | Example | Bulk density (g/l) | Molar ratio galacturonic acid:glucose [#] | Struct, value (µm/µm$^3$) |
|---|---|---|---|---|
| Apple | 1 | 7.8 | n.d. | 0.0018 |
| Carrot | 2 | 7.5 | 0.83 | 0.0024 |
| Carrot | 3 | 8 | 0.64 | 0.0056 |
| Aubergine | 3 | 4.2 | 0.40 | 0.0096 |
| Cucumber | 3 | nd | n.d. | nd |
| Leek | 4 | 7 | 0.24 | 0.0123 |
| Cucumber | 4 | 5 | n.d. | 0.0128 |

The invention claimed is:

1. A water-in-oil emulsion comprising 30-90 wt. % of a structured continuous fat phase and 10-70 wt. % of a dispersed aqueous phase, said structured continuous fat phase comprising:
   95-99.9 wt. % fat, said fat having a solid fat content at 20° C. ($N_{20}$) of 5-50% and a liquid oil content at 20° C. that equals 100%-$N_{20}$;
   particulate anhydrous non-defibrillated cell wall material from plant parenchymal tissue, said particulate anhydrous non-defibrillated cell wall material having a particle size of between 25 µm and 500 µm;

wherein the particulate anhydrous non-defibrillated cell wall material is present in the structured continuous fat phase in a concentration of 0.2-10% by weight of the liquid oil, and wherein the dispersed aqueous phase contains at least 80 wt % water.

2. The emulsion according to claim 1, wherein the particulate anhydrous non-defibrillated cell wall material is present in the structured continuous fat phase in a concentration of 0.1-5% by weight of the structured continuous fat phase.

3. The emulsion according to claim 1, wherein the fat has a solid fat content at 35° C. ($N_{35}$) of 0-20%.

4. The emulsion according to claim 1, wherein the combination of the structured continuous fat phase and the dispersed aqueous phase constitutes at least 80 wt. % of the water-in-oil emulsion.

5. The emulsion according to claim 1, wherein the emulsion has a Stevens hardness at 5° C. of at least 30 g.

6. The emulsion according to claim 1, wherein the anhydrous non-defibrillated cell wall material contains galacturonic acid and glucose in a molar ratio of less than 0.60.

7. The emulsion according to claim 1, wherein the particulate anhydrous non-defibrillated cell wall material originates from fruit, bulb, root, tuber, leave, and/or stem tissue.

8. The emulsion according to claim 1, wherein the particulate anhydrous non-defibrillated cell wall material originates from one or more plant sources selected from carrot, aubergine, cucumber, sugar beet, apple, pear, leek, pumpkin, kiwi, strawberry, papaya, pine apple, prune, melon, apricot, grapes onion, tomato, potato, coconut.

9. A process of preparing a water-in-oil emulsion, said process comprising:

preparing a pre-emulsion by mixing molten fat and aqueous liquid, said fat having a solid fat content at 20° C. ($N_{20}$) of 5-50% and a liquid oil content at 20° C. that equals 100%-$N_{20}$;

cooling the pre-emulsion to a temperature that is at least 5° C. below the slip melting point of the fat;

mixing the cooled pre-emulsion with particulate anhydrous non-defibrillated cell wall material from plant parenchymal tissue;

wherein the particulate cell wall material has a bulk density of less than 50 g/l and 20 at least 90 wt. % of said particulate cell wall material has a particle size between 25 μm and 500 μm; and wherein the particulate cell wall material is mixed with the pre-emulsion in an amount of 0.1 to 10 parts by weight per 100 parts by weight of liquid oil, wherein the process yields a water-in-oil emulsion comprising:

30-90 wt. % of a structured continuous fat phase and 10-70 wt. % of a dispersed aqueous phase, said structured continuous fat phase comprising:

95-99.9 wt. % fat, said fat having a solid fat content at 20° C. ($N_{20}$) of 5-50% and a liquid oil content at 20° C. that equals 100%-$N_{20}$;

particulate anhydrous non-defibrillated cell wall material from plant parenchymal tissue, said particulate anhydrous non-defibrillated cell wall material having a particle size of between 25 μm and 500 μm;

wherein the particulate anhydrous non-defibrillated cell wall material is present in the structured continuous fat phase in a concentration of 0.2-10% by weight of the liquid oil, and wherein the dispersed aqueous phase contains at least 80 wt % water.

10. The process according to claim 9, wherein the particulate cell wall material has a bulk density of less than 20 g/l.

11. The process according to claim 9, wherein the particulate anhydrous non-defibrillated cell wall material when dispersed in demineralised water in a concentration of 3 wt. % produces a suspension having a conductivity of less than 200 μS/cm.

12. The process according to claim 9, wherein the process comprises mixing 100 parts by weight of fat with 0.3-4 parts by weight of the particulate anhydrous non-defibrillated cell wall material.

* * * * *